US010841684B2

(12) United States Patent
Gu et al.

(10) Patent No.: US 10,841,684 B2
(45) Date of Patent: Nov. 17, 2020

(54) WIRELESS CHARGING FOR HEADPHONES

(71) Applicant: Google LLC, Mountain View, CA (US)

(72) Inventors: Changzhan Gu, Milpitas, CA (US);
Jae-won Hwang, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/238,882

(22) Filed: Jan. 3, 2019

(65) Prior Publication Data
US 2020/0221208 A1    Jul. 9, 2020

(51) Int. Cl.
*H02J 50/10* (2016.01)
*H04R 1/10* (2006.01)
*H02J 7/02* (2016.01)
*H02J 7/00* (2006.01)

(52) U.S. Cl.
CPC .......... *H04R 1/1025* (2013.01); *H02J 7/0042* (2013.01); *H02J 7/0068* (2013.01); *H02J 7/025* (2013.01); *H02J 50/10* (2016.02)

(58) Field of Classification Search
CPC ...... H04R 1/1025; H02J 50/10; H02J 7/0042; H02J 7/0068; H02J 7/025
USPC .................................................. 381/74, 328
See application file for complete search history.

(56) References Cited

U.S. PATENT DOCUMENTS

| 7,548,040 | B2  | 6/2009  | Lee et al. |
| 7,986,803 | B1* | 7/2011  | DeKalb ................ H04R 1/1066 381/328 |
| 8,185,084 | B2  | 5/2012  | Terlizzi |
| 8,593,573 | B2  | 11/2013 | Price |
| 9,362,778 | B2  | 6/2016  | Lee |
| 9,544,683 | B2  | 1/2017  | Ganem et al. |
| 9,583,256 | B2  | 2/2017  | Lapetina et al. |
| 9,601,943 | B2  | 3/2017  | Partovi et al. |
| 9,667,084 | B2  | 5/2017  | Pigott |
| 9,788,094 | B2  | 10/2017 | Swanson |
| 9,837,846 | B2  | 12/2017 | Partovi |
| 9,877,098 | B1* | 1/2018  | Riley ................... H04R 1/1033 |

(Continued)

FOREIGN PATENT DOCUMENTS

CN          208094292         11/2018

OTHER PUBLICATIONS

'Booth [online],' "Google Updated Its Wireless Earbuds with a Bold New Feature—A Wire", available on or before Jan. 2019 via Internet Archive: Wayback Machines URL https://web.archive.org/web/*/https://thenextweb.com/plugged/2018/10/10/google-pixel-buds-usb-c-earbuds/, retrieved on May 14, 2019, URL https://thenextweb.com/plugged/2018/10/10/google-pixel-buds-usb-c-earbuds/, 5 pages.

(Continued)

*Primary Examiner* — Vivian C Chin
*Assistant Examiner* — Friedrich Fahnert
(74) *Attorney, Agent, or Firm* — Fish & Richardson P.C.

(57) ABSTRACT

In some implementations, a headphone device includes an earpiece housing, a speaker in the earpiece housing configured to produce audio, and a wireless charging coil having a first portion that extends outside the earpiece housing and a second portion that extends within the earpiece housing. A battery charging circuit is coupled to the wireless charging coil, and the battery charging circuit is configured to charge a battery of the headphone device based on electrical current induced in the wireless charging coil.

19 Claims, 4 Drawing Sheets

(56) References Cited

U.S. PATENT DOCUMENTS

| | | | |
|---|---|---|---|
| 10,224,736 B2 | 3/2019 | Schoene et al. | |
| 10,250,965 B2 | 4/2019 | Bullen et al. | |
| 2007/0032274 A1* | 2/2007 | Lee | H04R 1/1025 |
| | | | 455/575.2 |
| 2011/0141357 A1 | 6/2011 | Price et al. | |
| 2016/0134142 A1 | 5/2016 | Murphy et al. | |
| 2018/0069601 A1* | 3/2018 | Qiu | H02J 50/10 |
| 2018/0199128 A1* | 7/2018 | Chiu | H04R 1/1041 |
| 2018/0358834 A1 | 12/2018 | Partovi | |
| 2019/0230429 A1* | 7/2019 | Bozaglo | H04R 1/08 |

OTHER PUBLICATIONS

'gizmodo.com' [online] "Sony's New Buds Have Holes in Them for Your Own Good," Sam Rutherford, Feb. 25, 2018 [retrieved on Apr. 30, 2019] Retrieved from Internet: URLhttps://gizmodo.com/sonys-new-buds-have-holes-in-them-for-your-own-good-1823319123, 6 pages.

'google.com [online],' "Google Pixel Buds: How to wear Google Pixel Buds," 2019, [retrieved May 14, 2019], retrieved from: URLhttps://support.google.com/googlepixelbuds/answer/7573099?hl=en, 3 pages.

'Horaczek [online],' "Google Pixel Buds Review: The Best Wireless Headphones I've ever wanted to Throw in the River," Nov. 2017, [retrieved on May 14, 2019], retrieved from: URLhttps://www.popsci.com/google-pixel-buds-wireless-headphone-review, 3 pages.

'Machkovech [online],' "Pixel Buds Review: OK Google, go back to the earbud drawing board," Nov. 2017, [retrieved Nov. 2017], retrieved from: URLhttps://arstechnica.com/gadgets/2017/11/pixel-buds-review-ok-google-go-back-to-the-earbud-drawing-board/, 6 pages.

'O'Kane [online],' "Google Pixel Buds Review: The Future Shouldn't Be This Awkward," Nov. 2017, [retrieved May 14, 2019], retrieved from: URLhttps://www.theverge.com/2017/11/16/16659314/google-pixel-buds-review-bluetooth-headphones, 14 pages.

'Savov [online],' "Google Pixel USB-C Earbuds Review: More Than Okay Google," Oct. 2018, [retrieved on May 14, 2019], retrieved from: URLhttps://www.theverge.com/2018/10/17/17988574/google-pixel-usb-c-earbuds-review-assistant-headphones, 9 pages.

'wikipedia.com [online],' "Inductive Charging," Apr. 2019, [retrieved on May 14, 2019], retrieved from: URLhttps://en.wikipedia.org/wiki/Inductive_charging, 9 pages.

'wikipedia.com [online],' "Qi (standard)," Apr. 2019, [retrieved on May 14, 2019], retrieved from: URLhttps://en.wikipedia.org/wiki/Qi_(standard), 5 pages.

'wikipedia.com [online],' "Resonant Inductive Coupling," Nov. 2018, [retrieved on May 14, 2019], retrieved from: URLhttps://en.wikipedia.org/wiki/Resonant_inductive_coupling, 7 pages.

\* cited by examiner

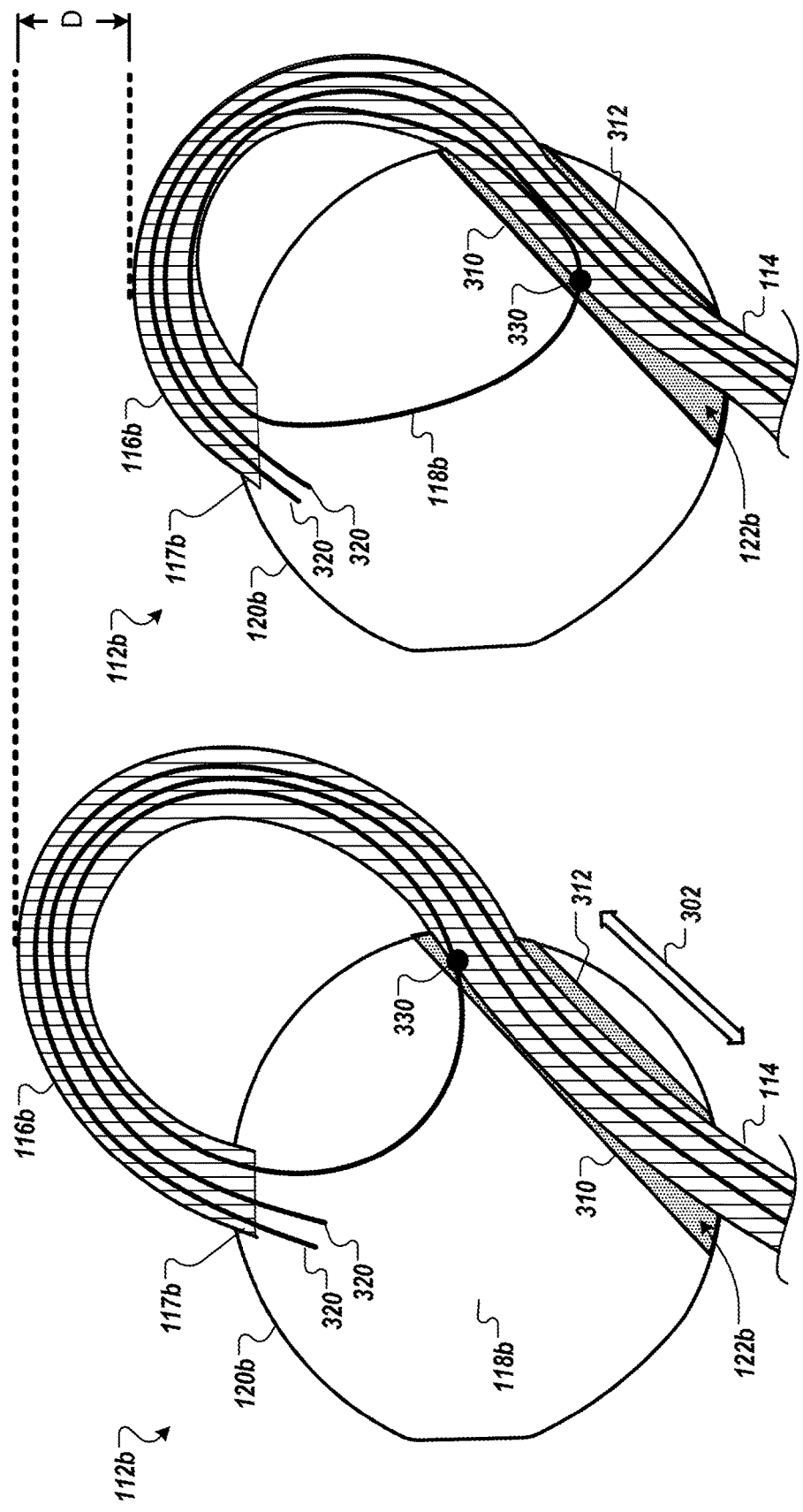

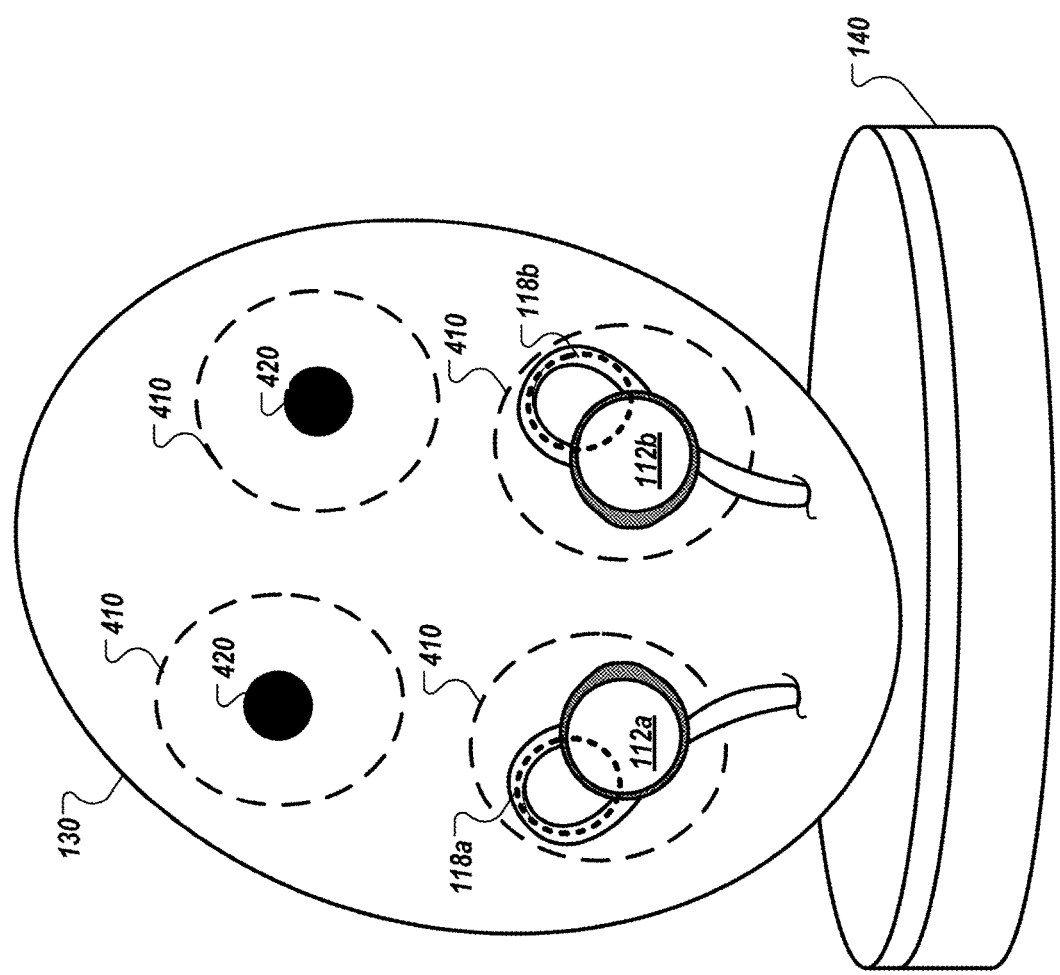

WIRELESS CHARGING FOR HEADPHONES

BACKGROUND

The present specification relates to wireless charging for headphones.

Some headphones (e.g., earpieces, earbuds, headsets, or other audio-producing devices worn on or near the head) include a battery to power the headphones, for example, so the headphones can operate without a constant connection to an audio source and/or power source. These may receive audio information through a wired interface or through a wireless interface, e.g., Bluetooth, Wi-Fi, etc. The battery is generally charged by periodically connecting the headphone to a power source through a wired connection.

SUMMARY

In some implementations, a headphone device includes an integrated wireless charging coil that can inductively couple with a wireless charger to charge a battery of the headphone device. In particular, wireless charging coil(s) can be located in one or more earphones. A wireless charging coil of an earphone can have (i) a portion that extends through a housing of the earphone, and (ii) a portion that extends out of the housing. This arrangement allows a larger charging coil than would fit entirely within the earphone housing. For small earpieces, for example, in-ear devices such as earbuds, this arrangement can significantly increase the size of charging coil that can be used, which in turn can increase the speed and efficiency of wireless charging without requiring an increase in the size of the earbud housing. The placement of the coil partially or mostly outside the earbud housing can conserve space within the housing and make the layout of components in the housing more efficient, allowing integration of the wireless charging coil without increase in size of the housing. For example, arranging the wireless charging coil to extend partially within and partially outside an earbud housing can increase the allowable size of a coil from a radius of less than 1 cm (given the constraints of being located within a typical earbud housing) to a radius of more than 1 cm, or even 2 cm or more.

Earphones may have an element that projects outward from an earphone housing to engage the wearer's ear and hold the earphone in place. The projection may be in the form of a hook, loop, or other structure. The wireless charging coil can be located so that at least a portion of the wireless charging coil is integrated with the projection, e.g., located on or in the projection.

In some implementations, the headphone device has one or more earpieces that have a cable segment extending from the earpiece housing. The cable segment can form a loop, for example, by a portion of the cable extending out of the housing, forming a loop as it bends back toward the housing, and then extending back into the earpiece housing (e.g., through an opening, channel, or other feature defined in the housing). The cable loop may be located at an outer edge of the earpiece housing and be located and configured to engage a user's ear in a way that holds the earpiece in place in the user's ear. The cable segment that forms the loop through which the charging coil extends can also include wires that carry audio data or other signals into the housing for processing. This is not required however, and the wireless charging coil may alternatively pass through a loop that does not carry other wires for powering or driving the earphone, with electrical signals entering the housing through another cable.

In some implementations, the cable is repositionable (e.g., slidable through or pressable into an opening in the earpiece housing) to adjust the size of the cable loop, thus allowing a user to increase or decrease the size of the loop to an appropriate size for the user's ear. The earpiece housing and cable may include features that cooperate to retain the cable at any of multiple different positions. In some implementations, the size of the cable loop is continuously variable so that any user-selected cable loop size within a range of potential loop sizes can be set and maintained by the engagement of the cable and the earpiece housing. For example, the earpiece housing can be structured to retain the cable by engaging any position along a region of the cable loop. In some implementations, the earpiece housing and the cable cooperate to retain the cable at any of multiple discrete, user-selectable locations corresponding to different sizes of the cable loop.

In one general aspect, a headphone device includes: an earpiece housing; a speaker in the earpiece housing configured to produce audio; a wireless charging coil having a first portion that extends outside the earpiece housing and a second portion that extends within the earpiece housing; and a battery charging circuit coupled to the wireless charging coil, the battery charging circuit configured to charge a battery of the headphone device based on electrical current induced in the wireless charging coil.

In some implementations, the headphone device includes a projection configured to engage an ear of a wearer of the headphone device to stabilize a position of the earphone housing with respect to the ear when the headphone device is worn by the user, wherein at least some of the first portion of the wireless charging coil is located within the projection.

In some implementations, the charging coil has a largest length across the coil that is between 1 and 2 cm.

In some implementations, the headphone device includes a magnet attached to the earpiece housing, the magnet being arranged to couple the headphone device with a wireless charger.

In some implementations, the headphone device includes a control unit, the battery charging circuit being located within the control unit, and the control unit is external to the earpiece housing and is coupled to the earpiece housing by the cable.

In some implementations, the headphone device includes an indicator on the earpiece housing that is configured to indicate when battery charging is occurring using the charging coil.

In some implementations, the projection is a loop of a cable segment, the loop extending outward from the earpiece housing, wherein the first portion of the wireless charging coil extends through the loop outside the earpiece housing.

In some implementations, the earpiece housing defines an opening to receive the cable, and the cable segment is configured to extend out of the earpiece housing, back toward the earpiece housing, and into the opening to form the loop.

In some implementations, the opening includes a channel extending along a length along an exterior side of the earphone housing, the channel defining an opening that extends from within the channel outward in a direction perpendicular to the length of the channel to an exterior of the earphone housing.

In some implementations, the loop is adjustable in size and the earpiece housing is configured to retain the loop in any of multiple sizes of the loop.

In some implementations, to adjust the size of the loop, the cable is repositionable to any of position along a continuous range of positions with respect to the earpiece housing.

In some implementations, the earpiece housing has one or more features shaped to engage the cable and retain the cable in a user-selected position along the continuous range of positions.

In some implementations, the cable, charging coil, and earpiece housing are arranged such that increasing the size of the loop increases an amount of the charging coil located outside of the earpiece housing, and decreasing the size of the loop decreases an amount of the charging coil located outside the earpiece housing.

In some implementations, the cable segment is configured to carry at least one of analog audio signals, digital audio data, power from a battery, or control information to circuitry within in the earpiece housing.

In some implementations, the headphone device includes: a second earpiece housing; a second speaker in the second earpiece housing configured to produce audio; a second cable segment coupled to the second earpiece, the second cable segment being configured to form a second loop that extends outward from the second earpiece housing; and a second wireless charging coil having a first portion that extends through the second loop outside the second earpiece housing and a second portion that extends within the second earpiece housing.

In some implementations, the headphone device includes a wireless connection module that is configured to wirelessly exchange data with a computing device, the wireless connection module being configured to send data indicating the battery charge status to the computing device.

In another general aspect, a headphone device includes: (1) a first earpiece that includes: a first earpiece housing, a first speaker in the first earpiece housing configured to produce audio, a first cable segment configured to form a first loop that extends outward from the first earpiece housing, and a first wireless charging coil having (i) a portion that extends through the first loop outside the first earpiece housing and (ii) a portion that extends within the first earpiece housing; a second earpiece comprising: (2) a second earpiece housing, a second speaker in the second earpiece housing configured to produce audio, a second cable segment configured to form a second loop that extends outward from the second earpiece housing, and a second wireless charging coil having (i) a portion that extends through the second loop outside the second earpiece housing and (ii) a portion that extends within the second housing; (3) at least one battery configured to power the headphone device; and (4) a battery charging circuit coupled to the wireless charging coils, the charging circuit being configured to charge the battery based on electrical current induced in the wireless charging coil.

In some implementations, the headphone device includes a control box having one or more user-selectable controls, the first cable segment and the second cable segment being coupled to the control box.

In another general aspect, a method includes: receiving, at an earpiece of a headphone device, magnetic fields of a wireless charger that induce a current in a wireless charging coil integrated with the earpiece, the wireless charging coil extending partially within a housing of the earpiece and partially outside the housing of the earpiece; processing the current induced through the wireless charging coil with a battery charging circuit of the headphone device; and charging a battery of the headphone device using output of the battery charging circuit.

Advantageous implementations can include one or more of the following features. The arrangement discussed in this document allow a wireless charging coil to be integrated into small earphones, such as individual earbuds, without increasing the overall size of the earphones. A loop of a cable that carries signals to an earphone (e.g., audio data, control signals, speaker drive signals, power, etc.) can engage a wearer's ear to keep the earphone from falling off and also include a portion of the wireless charging coil. The arrangement of the wireless charging coil extending partially or mostly outside the earphone housing can allow a larger wireless charging coil than would be permitted if placing the coil within the housing. This can increase the speed and efficiency of wireless charging. In addition, locating a portion of the wireless charging coil outside the earpiece housing can limit the amount of space within the earpiece housing that the coil occupies, allowing for a smaller earpiece. Wireless charging coils can be placed in each earpiece of a headphone device, allowing for greater speed of charging than a single coil. The integration of the wireless charging coils into the earpieces allows the ability to charge the headphone device without the need for any additional cords, adapters, or removable components, as the headphone device can be charged simply through inductive coupling with a charging pad.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 3A and 3B show cross-sectional views of an earbud having a wireless charging coil, with a stabilizing loop of the earbud shown in different adjustment positions.

FIG. 4 illustrates an earbud having an integrated wireless charging coil being wirelessly charged on a charging pad.

Like reference numbers and designations in the various drawings indicate like elements.

DETAILED DESCRIPTION

Figure 1:
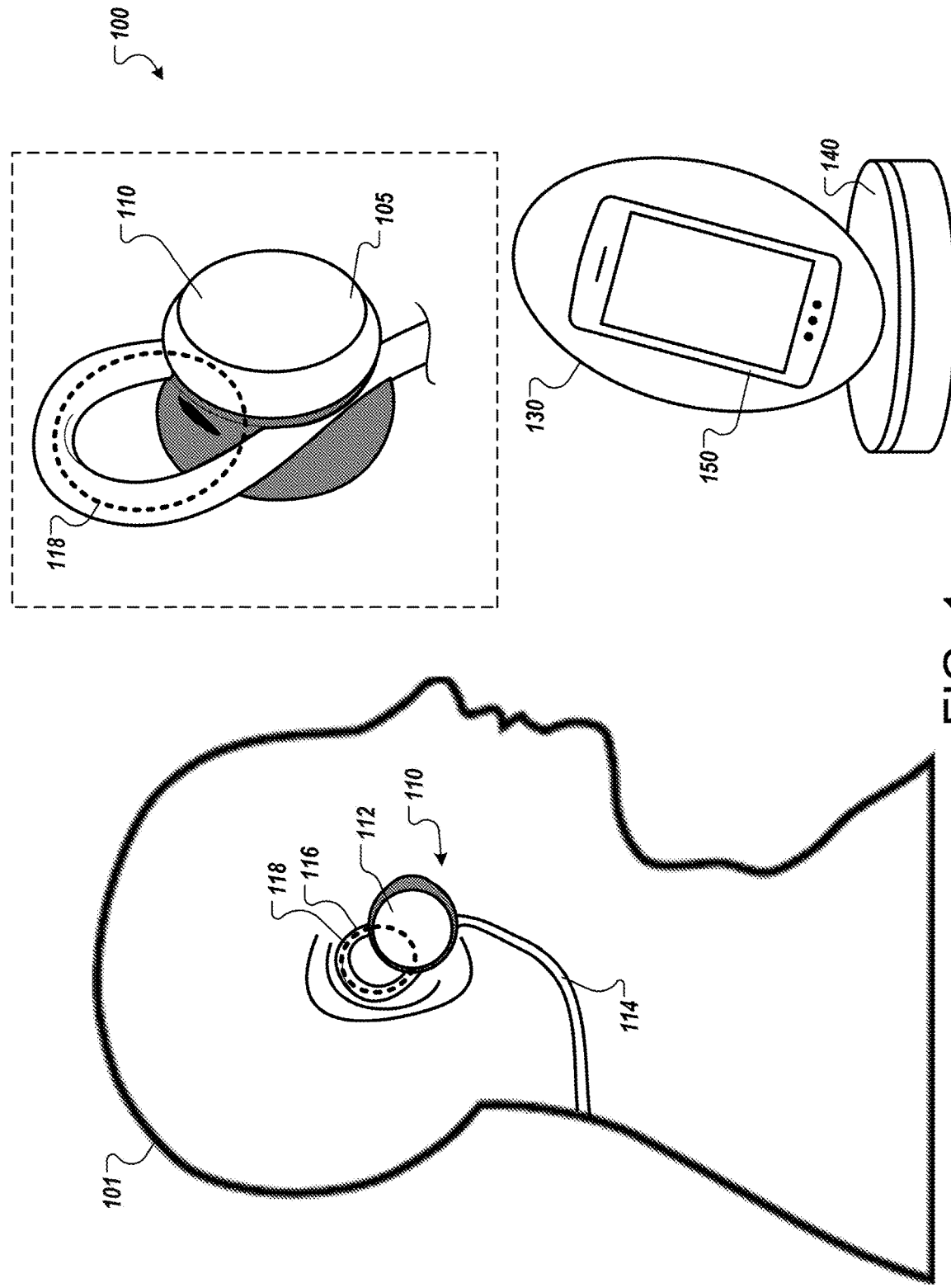
FIG. 1 is a diagram of a system including headphone device that can be wirelessly charged.

FIG. 1 is a diagram of a system 100 including a headphone device 110 that can be wirelessly charged. The system 100 includes the headphone device 110, an electronic device 150 that provides audio data, and a wireless charging pad 130 that is arranged on a base 140.

Figure 2:
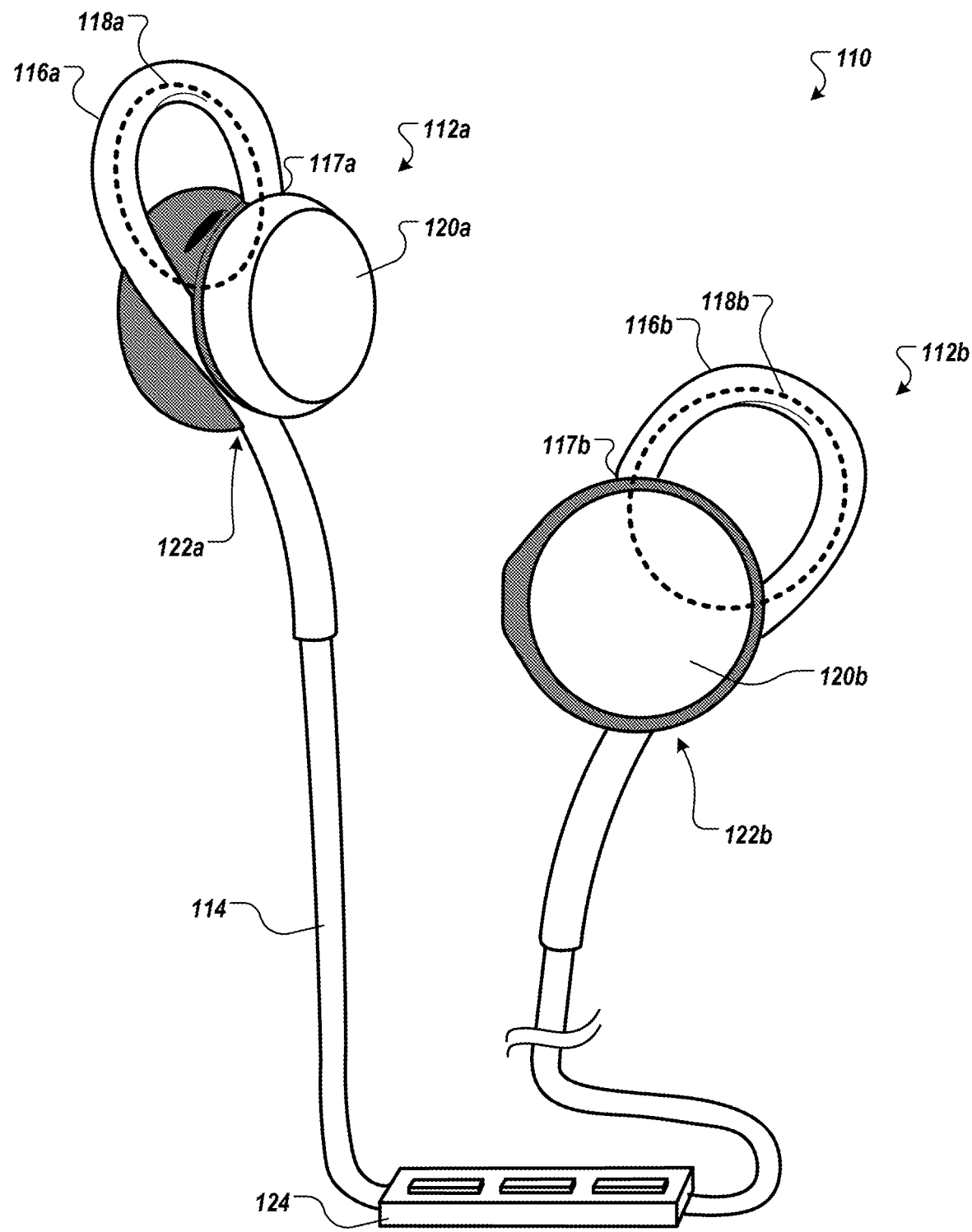
FIG. 2 is a diagram of the headphone device of FIG. 1.

The headphone device 110 includes two earbuds 110, as shown in more detail in FIG. 2. Each of the earbuds 110 includes a speaker to generate sounds for a user. The headphone device 110 includes one or more internal batteries that powers the electronics of the headphone device 110.

The headphone device 110 also includes one or more wireless charging coils 118 that enable the headphone device 110 to charge the battery through wireless power transfer when the headphone device 110 is placed on the charging pad 130. In particular, a wireless charging coil 118 can be integrated into each of the earbuds 110, allowing each coil 118 inductively couple to a power transmission coil of the wireless charging pad 130 to receive power. Using power received with the wireless charging coils 118, the battery of the headphone device 110 can be charged using the same wireless charging pad 130 that is typically used to charge a mobile phone, a watch, or other type of device.

The headphone device 110 includes a projection 116 that extends from an earbud 112 to engage a user's ear. The projection 116 can be arranged to stabilize the position of the earbud 112, for example, to hold the earbud 112 in place so it does not fall out of the user's ear. The projection 116 can be shaped and arranged to engage any of various parts of the ear, such as the concha, fossa, antihelix, scapha, and/or helix of the ear.

In some implementations, the projection 116 includes a loop of a cable, such as a loop of a cable 114 that provides audio information, control information, and/or power to or from the earbud 112. For example, the projection 116 shown is formed of a loop of the cable 114 that extends outward from a housing of the earbud 112 and rests in the ear of the user 101. The loop, and consequently any elements extending within the loop, can be flexible and can conforms to the ear of a user. The loop may be resilient and may deform in response to a force and then return to its earlier shape when force is removed. The projection 116, including in the form of a loop, may be generally circular, but is not required to be. The projection 116 may be oval or even of an irregular shape to nest into a recess of a wearer's ear. As shown in the figure, the projection 116 may extend along a plane that so that, when worn by the user, the plane is generally parallel to an adjacent surface of the ear facing outward from the ear.

Although the projection 116 is shown as a loop of a cable in various example, the projection 116 may alternatively be formed of a different material or have a different shape. In general, the projection can be any appropriate element projecting from main housing of an earpiece, and can be sized and arranged to engage a portion of the ear to stabilize or hold the earpiece in position in, on, or around the ear.

As discussed further below, the wireless charging coil 118 for an earbud 112 can be integrated with the projection 116 used to fit the earbud 112 to the user's ear. For example, the wireless charging coil 118 can extend through the cable loop, with part of the wireless charging coil 118 in the cable loop, and another part of the wireless charging coil 118 residing within a housing of the earbud 112. The placement can help maximize the size of the charging coil 118 for the earbud 112, since the wireless charging coil 118 can have a larger size than would normally fit within the housing of the earbud 112. A larger charging coil 118, in turn, can increase the efficiency of power transfer and rate of power transfer that can be performed, allowing the headphone device 110 to be charged more quickly. With this arrangement, including the charging coil 118 does not require increasing the size of the earbud 112, even if the charging coil 118 has a dimension (e.g., a maximum length across the coil, such as a diameter if the coil is round or a major axis if the coil is an oval shape) nearly as large as or larger than the earbud housing. The charging coil 118 also does not require additional projections or add-on elements, as the charging coil 118 can be integrated with a feature providing physical fit for the user as well as transfer of data, power, and/or control signals.

The charging coil 118 may include multiple turns of wire. In some implementations, the coil 118 may include roughly 2-6 turns of wire.

In some implementations, the placement of the wireless charging coil 118 at least partially outside the earbud 112 can also increase the efficiency of wireless charging by spacing the charging coil 118 apart somewhat from metal or magnetic components of the earbud that could otherwise have the effect of dissipating magnetic fields or blocking magnetic fields. In some implementations, roughly 30-70% of the charging coil 118 is outside the housing, or at least half of the charging coil 118.

In some implementations, the cable loop in which the wireless charging coil 118 extends has a fixed size. Headphone devices 110 having different sizes of cable loops can be provided to accommodate users with different sizes of ears. In some implementations, as discussed in more detail in FIGS. 2 and 3A-3B, the cable loop has an adjustable size, allowing a user to change the position of the cable to adjust the size and/or shape of the cable loop for better fit and comfort, even though a portion of the wireless charging coil 118 extends through the loop.

The example of FIG. 1 shows a headphone device 110 that receives audio information wirelessly from an electronic device 150, such as a phone, tablet computer, entertainment system, laptop computer, desktop computer, smart watch, or wearable computing device. Thus, the headphone device 110 is configured to operate wirelessly, e.g., without the need for a wire to connect the headphones to a device in order to transmit or receive audio signals or control information. The electronic device 150 can provide audio data using a radiofrequency wireless connection, such as Bluetooth or Wi-Fi. The communication between the headphone device 110 and the electronic device 150 can be bidirectional, for example, to allow for user inputs or control signals to be provided from the headphone device 110 to the electronic device. This can facilitate the setting of volume levels, starting and stopping playback, seeking or skipping within media, and so on. Audio signals in digital or analog form can be provided from a paired device 150 and can be transmitted wirelessly to the headphone device 110 where the signals are played back with a speaker in the earbud 110.

In some implementations, the headphone device 110 includes a microphone either in one or both earbuds, or in a control box attached to the wireless headphones, can transmit audio signals from a user, e.g., user 101, to a computing device, e.g., device 150. A device can be paired with the earbuds using wireless pairing, e.g., Bluetooth pairing.

Although various examples in this document discuss wireless transfer of audio data to the headphone device 110, the techniques discussed can also be used for headphone devices that use digital or analog wired connections to receive audio data, such as universal serial bus (USB) connections (e.g., USB-C connections) and/or traditional analog headphone connections. The integration of one or more wireless charging coils 118 with a headphone device can be advantageous to allow wireless charging for any of various types of headphones, e.g., when audio data is provided in a wired or wireless fashion, when the data is provided in analog or digital form, and regardless of the specific form factor (e.g., earbuds, on-ear earphones, over-the-ear earphones, headsets including microphones, etc.).

FIG. 2 illustrates the headphone device 110 in greater detail. There are two earbuds 112a,112b that are connected by a cable 114 and a control box 124. Each earbud 112a, 112b has an earbud housing 120a, 120b, which houses electronics such as a speaker, and is typically formed of plastic, metal, or another relatively rigid material.

Each earbud 112a, 112b has a projection 116a, 116b that extends outward from the housing 120a, 120b. The projection 116a, 116b is formed of a loop of the cable 114. The loop includes an end 117a, 117b of the cable 114 that is fixed to the earbud housing 120a, 120b and that extends into the earbud housing 120a, 120b so that wires in the cable 114 connect to electronics within the earbud housing 120a, 120b. From the fixed end 117a, 117b, the cable extends away from the earbud housing 120a, 120b, then curves back toward the earbud housing 120a, 120b. The cable 114 extends into a channel 122a, 122b defined in the earbud housing 120a, 120b. For example, the channel 122a, 122b can be a groove, slot, track, or other passage that admits the cable 114 through it.

The channel 122a, 122b can be sized to allow movement of the cable 114 through the channel 122a, 122b when sufficient force is applied, but to engage the cable 114 sufficiently to retain the position of the cable 114. For example, the channel 122a, 122b may provide a friction fit or snap fit in some implementations. The channel 122a, 122b may be open at a side or may be closed (e.g., surrounding the cable 114 around an axis of the cable 114).

The arrangement of the channel 122a, 122b and the cable 114 can allow a user to adjust the size of the loops to adjust the fit of the earbuds 112a, 112b. For example, a user can slide the cable through the channel 122a, 122b to enlarge or shrink the loop of the projection 116a, 116b.

Each earbud 112a, 112b includes a wireless charging coil 118a, 118b that is connected to electronics of the headphone device 110. A portion of the wireless charging coil 118a, 118b extends out of the earbud housing 120a, 120b within the cable 114 that forms the loop of the projection 116a, 116b. Another portion of the wireless charging coil 118a, 118b is outside the cable 114 and is located within the earbud housing 120a, 120b. As the user adjusts the position of the cable 114 to set the size of the loops of the projections 116a, 116b, the position of the charging coil 118a, 118b may shift somewhat as shown in FIGS. 3A-3B.

The charging coils 118a, 118b can be routed through portions of the cable 114 along with wires used to transmit power, audio data, and/or control signals. The charging coils 118a, 118b can enter the cable 114 through the opening in their respective ends 117a, 117b of the cable 114 and follow the cable 114 outward from the earbud housing 120a. Each charging coil 118a, 118b can then exit the cable 114 through the side of the cable 114, for example, entering the earbud housing 120a at a location within the channel 122a, 122b.

The charging coils 118a, 118b are coupled with battery charging circuitry so that induced currents in the coils 118a, 118b are rectified and applied to charge a battery of the headphone device 110. The battery charging circuitry may be located in one of the earbuds 112a, 112b, in both of the earbuds 112a, 112b, and/or in the control box 124. The cable 114 may include conductors to transmit power received using the charging coils 118a, 118b to and from the control box 124 and/or between the earbuds 112a, 112b. In some implementations, the earbud housing 112a, 112b has a diameter smaller than the diameter of the corresponding charging coil 118a, 118b. Of course, the charging coils 118a, 118b and the earbud housings 112a, 112b may not have circular shapes or cross-sections. In general, the charging coils 118a, 118b may each have a dimension (e.g., a length or width, such as a longest dimension across each coil 118a, 118b) that is greater than a maximum dimension of the corresponding earbud housings 112a, 112b in the area where the coils 118a, 118b are located, so that the charging coils 118a, 118b at least partially extend outside the earbud housings 112a, 112b.

The control box 124 is optional, and can provide buttons or other controls for operating the headphone device 110. For example, buttons may allow a user to change volume of audio produced by the earbuds 112a, 112b and to provide inputs to adjust media playback (e.g., start, stop, skipping a track, fast forward, rewind, changing playback mode, and so on). The control box 124 or one or both of the earbuds 112a, 112b can include a microphone to allow sound to be detected and for corresponding audio data to be transmitted back to a connected electronic device 150.

Although the headphone device 110 is configured to be charged wirelessly, the headphone device can optionally include a port allowing a wired connection to receive power, such as a micro-USB socket. This can provide a user the versatility to charge in a wired or wireless manner, with whichever type of charger is currently available.

Although the earbuds 112a, 112b are shown connected by a cable 114, in some implementations each individual earbud 112a, 112b can be a separate device, with no wired connection or other physical connection between them. In that case, each earbud 112a, 112b may include, in addition to its own wireless charging coil 118a, 118b, its own battery and battery charging circuitry, as well as wireless communication circuitry to establish a wireless connection with the device 150 and/or the other earbud.

FIGS. 3A and 3B show cross-sectional views of the earbud 118b, with the stabilizing loop of the projection 116b shown in different positions. Differences in the figures illustrate the adjustability of the earbud 118b to expand and contract the size of the loop for better fit to the user's ear. For clarity in illustration, internal electronics of the earbud 118a, such as a speaker, a circuit board, a battery, battery charging circuitry, and so on, have been omitted from the figures.

The channel 122b can provide a generally cylindrical passage or may provide a passage of another shape. The cable 114 extends through opposite ends of the channel 122b. The channel 122b also has sides 310, 312 that extend along the cable 114. The inner side 310 can define an opening that allows the charging coil 118b to enter the earbud housing 120b through the inner side 310. The opening in the inner side 310 can extend along a portion of the side 310, e.g., as a slot extending along, some, most, or all of the side 310, to allow the charging coil 118b to travel along the side 310 (with the charging coil 118a extending through the opening in the side 310) as the size of the projection 116b is adjusted.

The cable 114 includes an outer jacket and one or more wires 320 within the outer jacket. The wires 320 may connect to a speaker, a circuit board, or other circuitry within the earbud housing 120b. The wires 320 may be arranged to carry analog audio signals, digital audio data, control signals, power, or other signals. The wires 320 and the charging coil 118b enter the cable 114 within the earbud housing 120b, through the fixed end 117b. The charging coil 118b and the wires 320 are initially routed together around the loop of projection 116b, until the charging coil 118b exits the cable 114 through the side of the outer jacket. As shown in FIGS. 3A-3B, this may occur at a portion of the cable 114 that is located in the channel 122b, at an exit point 330. This exit point 330 may be a fixed location on the side of the cable 114, and may be reinforced to avoid wear. When the position of the cable 114 is adjusted to change the size of the projection 116b, the position of the exit point 330 can move in a corresponding manner through the channel 122b.

The channel 122b is sized to allow the cable 114 to slide for some distance, e.g., 0.5 cm, 1 cm, 1.5 cm, etc., through the channel 122b. Arrow 302 shows the direction that the cable 114 can travel through the channel 112b, which in some implementations is along a substantially linear path. As the cable 114 travels through the channel 112, the loop of the projection 116b is expanded or contracted depending on the direction of travel, which increases or decreases the circumference of the loop. The cable 114 may include one or more elements that limit movement of the cable 114 through the channel 122b to a predetermined range. For example, a ridge or bump on the outer jacket of the cable 114 may act as a stop to block travel beyond a desired range. Similarly, the housing and the engagement with the charging coil 118b or associated elements may also limit movement to be within a fixed range. The channel 122b receives a portion of the cable 114 and can engage the outer jacket of the cable 114 to retain the position of the cable 114 in the channel 122b.

From the position of the cable 114 shown in FIG. 3A, moving of the cable 114 down through the channel 122b decreases the length of cable 114 forming the protrusion 116, and thus decreases the circumference of the loop to the size shown in FIG. 3B. The position of the portion of the charging coil 118b that is within the earbud housing 120b has also shifted, and the components in the earbud housing 120b can leave space to accommodate this movement. The charging coil 118b itself can be formed of a flexible wire material to allow small deformations to facilitate adjustment. As an alternative, in some implementations, the outer jacket of the cable 114 can define an elongated opening along the length of the cable, facing the side 310 of the channel 122b, which can allow the position of the exit point 330 for the charging coil 118b to change with respect to the cable 114 as the cable 114 travels through the channel 122b. This can allow adjustability of the loop with little or no deformation of the charging coil 118b in the process.

FIG. 4 illustrates the earbuds 112a, 112b charging wirelessly on the charging pad 130. The charging pad 130 may operate according to the Qi standard, or may use another wireless charging technique. The charging pad 130 has one or more power transmission coils 410 that produce magnetic fields that can induce current in the charging coils 118a, 118b. The example illustrated shows four transmission coils 410, although more or fewer may be used. The transmission coils 410 may each be larger than the charging coils 118a, 118b, for example, a diameter of 3 cm, 4 cm, 5 cm, etc. During charging, the wireless charging pad 130 emits alternating magnetic fields from the transmission coils 410, which in turn induces an alternating current in the charging coils 118a, 118b of the headphone device 110. The charging pad 130 may be powered by a connection to a power outlet or other power source.

The charging pad 130 includes one or more magnets 420 that assist in aligning the earbuds 112a, 112b so that the charging coils 118a, 118b are located correctly to allow for high efficiency of power transfer. The magnets 410 can attract a corresponding magnet or metal feature in the earbuds 112a, 112b, and the magnets 410 can provide a field sufficiently strong to hold the earbuds 112a, 112b in place against the charging pad 130, even though the charging pad 130 may be sloped or even vertical. In some implementations, one or more magnets 420 are included for each of multiple different transmission coils 410.

In some implementations, a magnet 420 is placed generally at the center of a transmission coil 410. Each earbud 112a, 112b may have a corresponding alignment magnet that, when placed directly over the magnet 420, positions the alignment coil 118a, 118b appropriately for charging with the adjacent transmission coil 410. The alignment magnet in the earbud 112a, 112b may be separate from any magnets in the speakers of the earbuds 112a, 112b. In some implementations, magnets of the speakers in the earbuds 112a, 112b may be used as alignment magnets for aligning and holding the earbuds 112a, 112b in place for wireless charging, instead of including separate permanent magnets.

In some implementations the charging pad 130 or its base 140 can indicate that charging is taking place using an indication on the charging pad. The charging indication may be a light, text, a chime, or some other indication that charging is taking place. The indication of charging may be on the charging plate 130 or on the base 140 of the charging pad. In other embodiments, an earbud may have an indication of charging, e.g., a charging indication light, on the earbud itself. For example, a light may indicate charging on the housing of an earbud. In still other embodiments, an indication of charging may be on the control box housing the charging circuit outside the housing of the earbuds.

In some embodiments, a status of an earbud battery may be sent wirelessly, e.g., using Bluetooth, to a computing device for display to a user. The status may indicate when the battery is fully charged, when the battery is depleted, or the percentage of battery charge at a given time.

Power conversion circuitry, which may be located in either or both earbuds 112a, 112b and/or the control box 124 may perform battery charging from the wirelessly received power. Current induced in the charging coils 118a, 118b can be passed to a rectifying circuit to convert the induced alternating current (AC) to direct current (DC). One or more capacitors can also be used to reduce fluctuations in the rectified voltage. A voltage regulator and/or battery charging circuit can regulate the rectified output to adjust the voltage and/or current applied to the battery, in accordance with a charging profile for the battery. For example, lithium-ion batteries often have a charging profile that includes multiple phases, such as a pre-charge phase, a constant current phase, and a constant voltage phase. Other types of batteries may use constant current charging or other charging modes. The rectifying circuit includes a capacitor connected to a dielectric metal acting as ground. The battery powers functional aspects of the headphone device 110 such as powering audio processing circuitry, digital-to-analog conversion circuitry, analog-to-digital circuitry, amplifier circuitry to drive audio speakers, a microprocessor, wireless communication circuitry, and so on.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A headphone device comprising:
    an earpiece housing that defines a recess;

a speaker in the earpiece housing configured to produce audio;

a wireless charging coil having a first portion that extends outside the earpiece housing and a second portion that extends within the earpiece housing;

a cable segment that extends from the earpiece housing, forms a loop outside the earpiece housing, extends into the recess in the earpiece housing, and exits the recess at an exterior of the earpiece housing, the first portion of the wireless charging coil extending through the loop of the cable segment; and a battery charging circuit coupled to the wireless charging coil, the battery charging circuit configured to charge a battery of the headphone device based on electrical current induced in the wireless charging coil.

2. The headphone device of claim 1, wherein the loop is configured to engage an ear of a wearer of the headphone device to stabilize a position of the earpiece housing with respect to the ear when the headphone device is worn by the wearer.

3. The headphone device of claim 1, wherein the wireless charging coil has a largest length across the wireless charging coil that is between 1 and 2 cm.

4. The headphone device of claim 1, comprising a magnet attached to the earpiece housing, the magnet being arranged to couple the headphone device with a wireless charger.

5. The headphone device of claim 1, further comprising a control unit, the battery charging circuit being located within the control unit, wherein the control unit is external to the earpiece housing and is coupled to the earpiece housing by the cable segment.

6. The headphone device of claim 1, wherein the recess comprises a channel extending along a length along an exterior side of the earpiece housing, the channel defining a space that extends from within the channel outward, in a direction perpendicular to the length of the channel, to an exterior of the earpiece housing.

7. The headphone device of claim 1, wherein the loop is adjustable in size and the earpiece housing is configured to retain the loop in any of multiple sizes of the loop.

8. The headphone device of claim 7, wherein, to adjust the size of the loop, the cable segment is repositionable to any of position along a continuous range of positions with respect to the earpiece housing.

9. The headphone device of claim 8, wherein the earpiece housing has one or more features shaped to engage the cable segment and retain the cable segment in a user-selected position along the continuous range of positions.

10. The headphone device of claim 7, wherein the cable segment, the wireless charging coil, and the earpiece housing are arranged such that increasing the size of the loop increases an amount of the wireless charging coil located outside of the earpiece housing, and decreasing the size of the loop decreases an amount of the wireless charging coil located outside the earpiece housing.

11. The headphone device of claim 1, wherein the cable segment is configured to carry at least one of analog audio signals, digital audio data, power from a battery, or control information to circuitry in the earpiece housing.

12. The headphone device of claim 1, further comprising:
a second earpiece housing;
a second speaker in the second earpiece housing configured to produce audio;

a second cable segment coupled to the second earpiece, the second cable segment being configured to form a second loop that extends outward from the second earpiece housing; and a second wireless charging coil having a first portion that extends through the second loop outside the second earpiece housing and a second portion that extends within the second earpiece housing.

13. The headphone device of claim 1, wherein the loop is formed of a fixed, non-adjustable length of the cable segment.

14. The headphone device of claim 1, wherein the cable segment extends out of the earpiece housing from a first opening in the earpiece housing, forms the loop outside the earpiece housing, enters the recess at a second opening in the earpiece housing, and extends through the recess to exit the earpiece housing at the exterior of the earpiece housing, the first portion of the wireless charging coil extending through the loop of the cable segment.

15. The headphone device of claim 14, wherein the cable segment includes one or more conductors separate from the wireless charging coil, the one or more extending through the loop along the first portion of the wireless charging coil, into the second opening in the earpiece housing, and out of the second opening in the earpiece housing with the cable segment;

wherein the headphone device is configured to send or receive at least one of analog audio signals, digital audio data, power from a battery, or control information using the one or more conductors.

16. The headphone device of claim 14, wherein the wireless charging coil extends into an interior of the earpiece housing through an opening that is defined in a side of the cable segment and located in the recess of the earpiece housing.

17. A headphone device comprising:
a first earpiece comprising:
a first earpiece housing that defines a first recess,
a first speaker in the first earpiece housing configured to produce audio,
a first cable segment that extends from the first earpiece housing, forms a first loop outside the first earpiece housing, extends into the first recess in the first earpiece housing, and exits the first recess at an exterior of the first earpiece housing, and
a first wireless charging coil having (i) a portion that extends through the first loop outside the first earpiece housing and (ii) a portion that extends within the first earpiece housing;
a second earpiece comprising:
a second earpiece housing that defines a second recess,
a second speaker in the second earpiece housing configured to produce audio,
a second cable segment that extends from the second earpiece housing, forms a second loop outside the second earpiece housing, extends into the second recess in the second earpiece housing, and exits the second recess at an exterior of the second earpiece housing, and
a second wireless charging coil having (i) a portion that extends through the second loop outside the second earpiece housing and (ii) a portion that extends within the second earpiece housing;
at least one battery configured to power the headphone device; and
a battery charging circuit coupled to the wireless charging coils, the battery charging circuit being configured to charge the at least one battery based on electrical current induced in the wireless charging coils.

18. The headphone device of claim 17, further comprising a control box having one or more user-selectable controls, the first cable segment extending through an opening in the first earpiece housing and to the control box, and the second cable segment extending through an opening in the second earpiece housing and to the control box.

19. A method comprising:
receiving, at an earpiece of a headphone device, magnetic fields of a wireless charger that induce a current in a wireless charging coil integrated with the earpiece, the wireless charging coil extending partially within a housing of the earpiece and partially outside the housing of the earpiece, the headphone device comprising a cable segment that extends from the earpiece housing, forms a loop outside the earpiece housing, extends into a recess in the earpiece housing, and exits the recess at an exterior of the earpiece housing, wherein a portion of the wireless charging coil extends through the loop of the cable segment;
processing the current induced through the wireless charging coil with a battery charging circuit of the headphone device; and
charging a battery of the headphone device using output of the battery charging circuit.

* * * * *